United States Patent [19]

Bellhouse

[11] Patent Number: 5,628,909
[45] Date of Patent: May 13, 1997

[54] MEMBRANE FILTERS WITH CORKSCREW VORTEX GENERATING MEANS

[75] Inventor: Brian J. Bellhouse, Oxford, United Kingdom

[73] Assignee: ISIS Innovation Limited, Oxford, United Kingdom

[21] Appl. No.: 530,136

[22] PCT Filed: Mar. 18, 1994

[86] PCT No.: PCT/GB94/00561

§ 371 Date: Nov. 20, 1995

§ 102(e) Date: Nov. 20, 1995

[87] PCT Pub. No.: WO94/21362

PCT Pub. Date: Sep. 29, 1994

[30] Foreign Application Priority Data

Mar. 19, 1993 [GB] United Kingdom ............... 9305788

[51] Int. Cl.$^6$ .................. B01D 61/00; B01D 63/00
[52] U.S. Cl. .................. 210/650; 210/323.2; 210/420; 210/456; 210/321.78; 210/321.87; 210/321.9
[58] Field of Search .................. 210/650, 456, 210/420, 323.2, 356, 321.72, 321.78, 321.87, 321.9, 354

[56] References Cited

U.S. PATENT DOCUMENTS

| | | | |
|---|---|---|---|
| 3,503,516 | 3/1970 | Harms et al. | 210/323.2 |
| 3,922,220 | 11/1975 | Middleman et al. | 210/321.78 |
| 4,124,510 | 11/1978 | Joh | 210/456 |
| 4,592,848 | 6/1986 | Pabst | 210/354 |
| 4,636,309 | 1/1987 | Bellhouse | 210/356 |
| 5,167,817 | 12/1992 | Bellhouse | 210/356 |
| 5,254,259 | 10/1993 | Bellhouse | 210/356 |

FOREIGN PATENT DOCUMENTS

| | | |
|---|---|---|
| 0052862 | 11/1981 | European Pat. Off. . |
| 63-65907 | 3/1988 | Japan . |
| 2318470 | 4/1973 | Netherlands . |

OTHER PUBLICATIONS

Pitera, Edward W. et al., "Convection Promotion in Tubular Desalination Membranes", Ind. Eng. Chem. Process Des. Develop., vol. 12, No. 1, 1973.

*Primary Examiner*—Ana Fortuna
*Attorney, Agent, or Firm*—Volpe and Koenig, PC

[57] ABSTRACT

A filter comprising a tubular filter membrane (1) within which is mounted a concentric core (2) formed with a helical groove (3) and leaving a gap (G). Fluid to be filtered is passed in the upwards direction into the space between the core (2) and the membrane (1) and thus constrained to move in a helical path within a helical space (8) defined between the groove (3) and membrane (1), with leakage flow (7) through the gap (G) between adjacent turns of the helix. The leakage flow (7) shapes and enhances an already-existing vortex flow within the space (8) and ensures effective scouring of the membrane to prevent build-up of solids on the membrane surface. A version incorporating an externally threaded helical groove is also described. The filter is useful for a wide range of filtration purposes, particularly in ultrafiltration and microfiltration.

17 Claims, 7 Drawing Sheets

MEMBRANE FILTERS WITH CORKSCREW VORTEX GENERATING MEANS

This invention relates to membrane filters particularly, but not exclusively, of the cross-flow type.

The performance of membrane filters is limited by the efficiency of fluid mixing to bring as much as possible of the fluid being filtered into contact with the membrane.

Various solutions have been proposed. One involves pulsing the fluid with an oscillatory flow along a channel at least partly defined by the membrane, the membrane either being furrowed or dimpled or the channel containing spaced obstructions, in order to produce eddies and other secondary flows. A difficulty of this is in the complexity of the mechanism required to produce the oscillatory flow. Other proposals have involved the use of narrow channels but have required high pressure drops from inlet to outlet, caused by frictional losses in the channels. Typical inlet and outlet pressures are 3.5 and 1 bar, respectively, and these produce uneven filtration and demand high pumping power. A third approach has been to use large bore tubes lined with thin layers of membrane which are perfused at flow rates high enough to ensure turbulent flow. This may solve the problem of poor mixing but at the expense of high pumping power and possible damage to components, such as proteins or blood cells, in the feed fluid.

What is required is a membrane filter which uses laminar secondary flows to provide gentle, efficient mixing, which can be scaled up easily and which requires modest pumping power.

An approach which goes some way to meeting these requirements is to induce a force in a direction tending to throw the particles being filtered away from the membrane to thus prevent clogging of the membrane. In a tubular filter this may be achieved by defining a helical path along which the fluid being filtered may flow. Such an arrangement is described in U.S. Pat. No. 3,768,660 which discloses a reverse osmosis cell comprising an elongate hollow porous core having an osmotic membrane on its surface. Fluid to be filtered is passed into the annulus formed between the core and an outer tubular shell. A flexible helical member is mounted within this annulus to thus define a helical path for the fluid flowing in the annular space. The circular flow thus induced creates a centrifugal force which acts to keep particles away from the membrane, to prevent clogging.

The present invention seeks to provide a filter which utilizes helical flow to induce centrifugal forces, but having improved performance by inducing a further component of motion in the fluid flowing around the helix, namely a corkscrew vortex component, which has been found to give much improved flushing of the membrane surface whilst at the same time maintaining substantially laminar flow to prevent damage to the particulate components in the fluid being filtered.

According to the present invention, there is provided a filter comprising a tubular, substantially cylindrical, porous membrane arranged coaxially with, and radially spaced from, a generally cylindrical profiled surface, which surface is formed with at least one helical groove, the arrangement being such that, in use, a fluid to be filtered is passed from one axial end along the passage defined between the membrane and the profiled surface. The invention is characterised in that means are further provided for inducing or enhancing, in the helical flow of the fluid to be filtered, a corkscrew vortex flow. It will be understood that the word corkscrew is intended to give the idea of a corkscrewing motion of the fluid in the existing direction of the helical flow—in other words a further helical component of fluid motion in addition to the principal helical flow defined by the helical groove. Preferably the vortex flow is such as to substantially fill the whole cross section of the helical flow path of the fluid being filtered. This is achieved by careful design of the geometry of the tubular membrane and profiled surface. In particular, those parts of the profiled surface where it most closely approaches the membrane between adjacent turns of the groove(s) are spaced from the membrane to define a narrow gap which will provide a leakage flow from turn to adjacent turn of the groove(s). The interaction between this leakage flow and the flow of the fluid along the helical path provided between the groove(s) and membrane will produce gentle laminar secondary flows, at least partly in the form of eddies, thereby providing the desired mixing to bring the fluid into maximum contact with the membrane. The gap is preferably at least ten times smaller than the diameter of the tubular membrane.

The cross sectional shape of the helical groove is important in achieving satisfactory vortexing of the flowing fluid. Preferably the shape is continuously curved, for example elliptical or circular. A part-circular cross section, in particular a semi-circular cross section has been found to give good results, but in certain circumstances this could be modified as will be explained later. However, the groove should not be too shallow since the vortex will be difficult to maintain and will break up into individual vortices which in turn will lead to relative "dead" zones in the motion of the fluid being filtered. For best results the width of the helical groove, in the longitudinal direction of the tubular membrane, is not significantly greater than three times its depth. Preferably the width of the groove is not greater than twice its depth.

The profiled surface may be formed as the outer peripheral surface of a core within the tubular membrane, or as the inner peripheral surface of a shell surrounding the tubular membrane. Thus it will be seen that the profiled surface has the form of an external or internal thread. Although only a single-start thread is described herein, the thread could be multi-start, for example double-start or triple-start.

Mathematical models and preliminary experiments establish the efficiency of the new system. The helical groove arrangement should be easy to manufacture and is likely to find application in membrane separation processes where flow rates are sufficient to generate the necessary secondary flows. In these applications the feed flow can be steady, thus avoiding problems associated with the complexity of the oscillatory drive systems and difficulty of scaling up of the vortex mixing and standing vortex wave designs previously developed. An obvious application of the invention would be to large scale ultrafiltration of liquid food and beverages, where high pumping costs are a major problem. Other applications include microfiltration (membranes with pores typically of 0.2 μm diameter, for cell concentration); reverse osmosis for the desalination of water, and gas exchange using a microporous hydrophobic membrane with pores of diameter of less than 0.02 μm.

In order that the invention may be better understood, several embodiments thereof will now be described by way of example only and with reference to the accompanying drawings in which.

DETAILED DESCRIPTION OF THE PREFERRED EMBODIMENTS

Figure 1A:
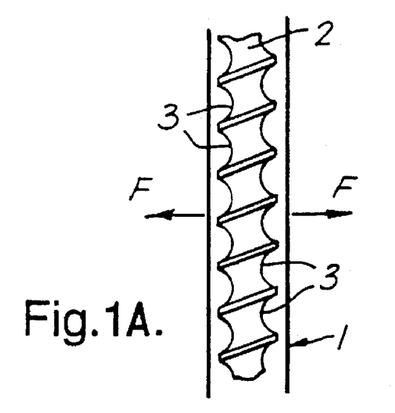
FIGS. 1A and 1B are an axial section and a cross section respectively through a first embodiment of a filter according to the invention.
Figure 1B:
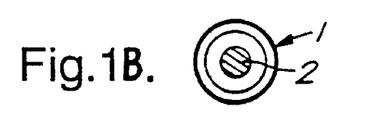
Figure 2:
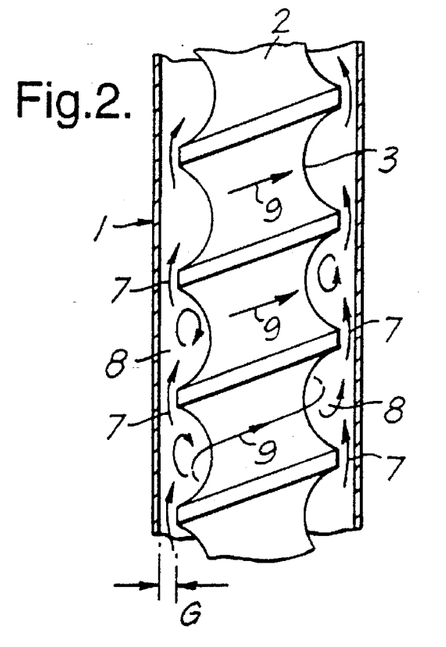
FIG. 2 is an enlarged view of part of FIG. 1A.

The first filter shown in FIGS. 1 and 2 is primarily intended for separating or concentrating proteins by molecular size. It consists of a tubular ultrafiltration membrane 1 and a cylindrical concentric core 2 formed on its exterior surface with a helical groove 3. The membrane has very small pores, for example of the order of 0.005 μm in diameter.

In use feed liquid is passed from one end to the other through the gap between the core and membrane. Fluid flow in the longitudinal direction of the filter is thus partly by a leakage flow 7 through a gap G defined between adjacent turns of the helical groove 3 and partly by a flow 9 along the helical path presented by the helical space 8 bounded by the groove 3 and the adjacent surface of the membrane 1. The leakage flow 7 between adjacent grooves augments secondary vortex flows generated in the helical space 8 by centrifugal forces. Making the cross section of the groove semicircular helps to maintain these secondary flows. Water and salts are filtered through the membrane. A combination of high shear at the membrane wall and the strong secondary flows keep the fluid well mixed, and thereby stops the retained proteins from blocking the membrane pores. The direction of filtrate flow is indicated by the letter F.

Figure 3A:
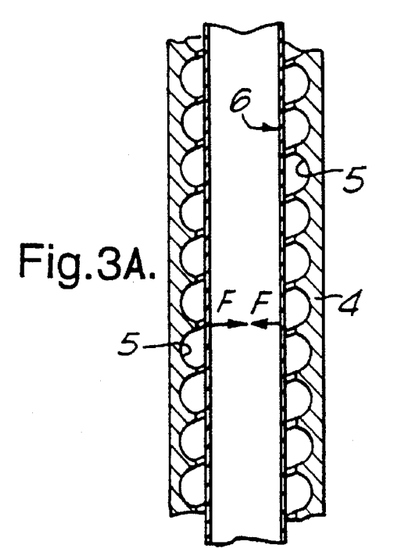
FIGS. 3A and 3B are an axial section and a cross section respectively through a second embodiment of a filter according to the invention.
Figure 3B:
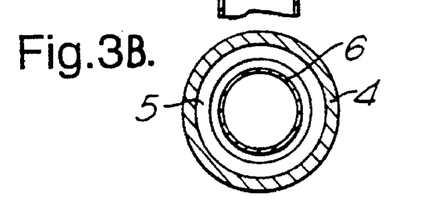
Figure 4:
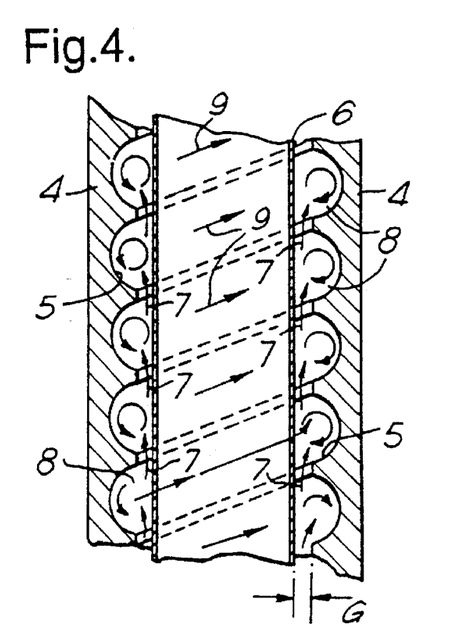
FIG. 4 is an enlarged view of part of FIG. 3A.

The filter shown in FIGS. 3 and 4 is primarily intended for separating cellular components from a fluid, e.g. red cells from whole blood. Here the helical space 8 is defined between a cylindrical shell 4 whose internal surface is formed with a helical groove 5, and a tubular microfiltration membrane 6 which surrounds, and is concentric with, the shell 4. In this case the membrane has larger pores, for example of the order of 0.5 μm in diameter, that is much smaller than cell diameters.

In use, the feed liquid is passed from end to end through the passage between the shell and membrane. In this case centrifugal force acts to push the blood cells towards the outer wall while the plasma moves towards the inner (membrane) wall. The centrifugal force on the cells exceeds the drag on the cells inwards by the plasma filtering through the membrane. The secondary flows are useful here, since otherwise cells would move along the helical path only relatively slowly and would tend to clog the filter on the outer impermeable wall.

In both the internal and external embodiments described above, the geometry of the arrangement is important in ensuring effective operation. The object of the exercise is to enhance the secondary vortex flow in the fluid passing along the helical space 8 defined by the helical groove 3 or 5. FIGS. 2 and 4 show the shape and position of the components in enlarged detail.

It will first be noted that, as illustrated, the grooves 3,5 are substantially semicircular in section. Other shapes are possible, but it is important to maintain the smooth curved surface of the groove to prevent generation of unwanted local eddies. Thus, stated in general terms, the groove should have a shape, when seen in longitudinal cross section, that is generally concave and is formed of a substantially continuously curved surface, preferably with no breaks which might cause eddies. Although a circular shape is preferred, other shapes such as elliptical would be possible. The groove might usefully be deeper than pure semicircular, but it should not be too much shallower. If, for example, the width of the groove in the longitudinal direction is taken as b, and the depth of the groove, not including the gap G is taken as a, then the following inequality should apply:

$$a < b < 5a$$

but preferably $$b = 2a \text{(i.e. semicircular)}$$

The gap G is defined between the crests of the ridge between adjacent turns of the helical groove 3, 5, and the facing diameter of the membrane 1, 6. This gap is important in creating the leakage flow 7 from one turn to the next. The width of the gap is such that it is between 10 and 60 times smaller than that diameter d of the membrane surface which faces the helical groove. Preferably the gap is between 30 and 50 times smaller than diameter d of the membrane.

The shape of the crest of the ridge is not felt to be of too much significance, except that the downstream edge of the crest should be reasonably sharp in order to provide as abrupt as possible a change for leakage fluid entering the space 8 from the gap G. This will enhance the vortex effect by ensuring sudden separation of leakage flow at the downstream edge of the crest.

Figure 5:
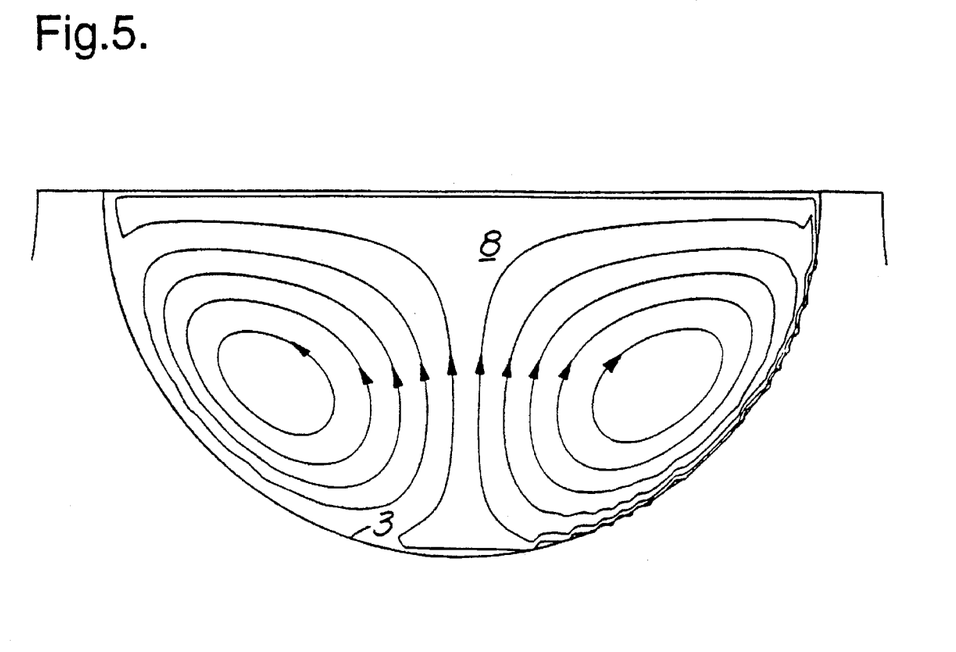
FIGS. 5 and 6 are diagrams to illustrate the vortex flow in the cross section of the helical groove.
Figure 6:
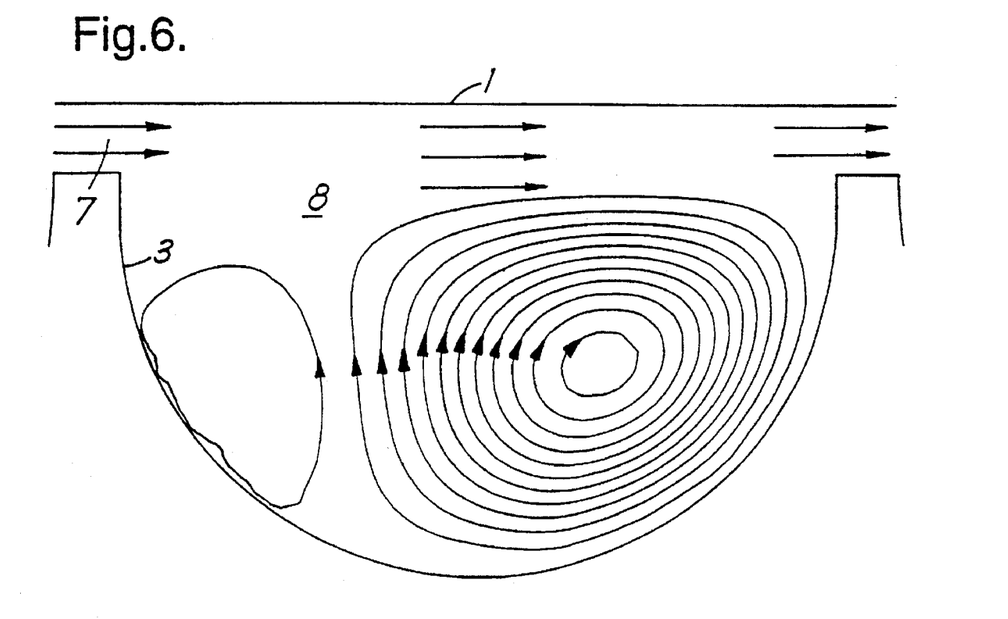

FIGS. 5 and 6 illustrate the action of the leakage flow on the pattern of flow in the space 8. FIGS. 5 and 6 illustrate just a single space 8, and represent a single turn of an internal helical groove of the type shown in FIGS. 1 and 2; however, the same principles apply to the external groove of FIGS. 3 and 4. The upstream side of the filter is to the left; the downstream side to the right. Thus leakage fluid enters through gap G on the left and exits to the right. FIGS. 5 and 6 have been prepared using mathematical modelling techniques and the density of lines is intended as a measure of the strength of the flow in the direction indicated.

FIG. 5 shows the situation in which the gap G is, in effect, of zero size so that the flow 7 of leakage fluid is likewise zero. The drawing represents the natural vortex flow pattern of fluid flowing around a helical path. As can be seen, the flow pattern comprises a left and a right corkscrew vortex pattern of substantially equal strength and extent. These flow patterns are created by centrifugal forces which, in the example illustrated, act substantially vertically in a direction from the bottom to the top of the drawing.

FIG. 6 shows the effect of applying a leakage flow 7. The action of the high velocity leakage flow is to overwhelm the pre-existing upstream corkscrew vortex and reinforce the downstream corkscrew vortex. Thus, in FIG. 6, it can be seen that the left-hand anticlockwise vortex is diminished in both size and strength, whilst the right-hand vortex is enhanced in both size and strength. In perfect conditions, the left-hand vortex will be reduced to zero and the flow through the filter will thus comprise three components:

1) The leakage flow passing through gap G. This can comprise as much as 50% of the bulk flow of fluid through the filter.

2) A helical flow within the space 8 bounded by the helical groove 3 or 5 and the adjacent membrane surface, this flow being subject to a centrifugal force extending radially from the longitudinal central axis of the filter. This centrifugal force is either towards or away from the membrane according to which of the filter types, FIG. 1 or FIG. 3 respectively, is being considered.

3) Also within the space 8, a secondary flow in the form of a corkscrew vortex. Of the two components of flow within the helical space 8 (helical and vortex) the vortex flow can be the stronger and the more effective in scouring the surface of the membrane to prevent clogging. For this purpose, it is clear that a single strong vortex is preferable to the situation illustrated in FIG. 5, or even FIG. 6, where relative "dead" zones in which fluid is relatively stagnant can cause build up of material on the membrane surface. The action of the vortex is thus twofold: firstly to scour the surface of the membrane to keep it clear of entrained solids, second to retain those entrained solids in suspension so that they are carried out of the filter by the helical component of flow. For certain fluids to be filtered, e.g. blood, these effects can be enhanced by arranging the filter such that the centrifugal forces due to the helical flow act away from the filter membrane. For this reason the; embodiment of Figures 3/4 has been found better for such fluids.

A still further geometrical factor which can affect operation is that of the pitch of the helical groove 3 or 5. It has been found that the ratio P/d, where p is the pitch, and d is the diameter of the membrane as defined previously, should lie in the range 1/8 to 1/1, preferably in the range 1/4 to 1/2. For multi-start threads, this ratio should be multiplied by the appropriate figure: for example, for a double-start thread, the ratio is multiplied by 2; for a triple-start thread, the ratio is multiplied by 3.

Figure 7:
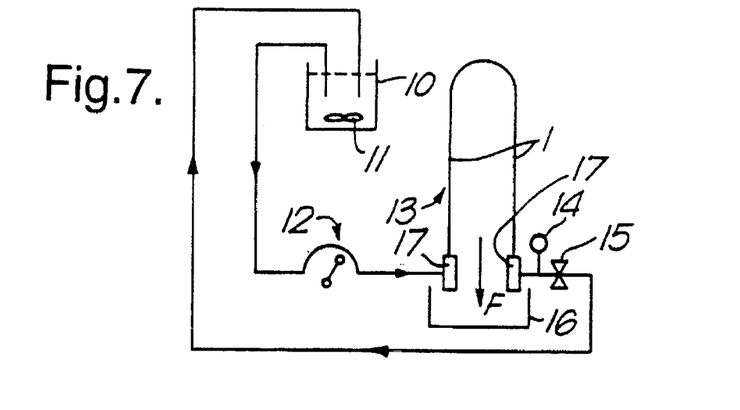
FIGS. 7 and 8 are diagrams to show test circuits for oscillatory and chopped flow respectively applied to the filter of FIGS. 1 and 2.
Figure 8:
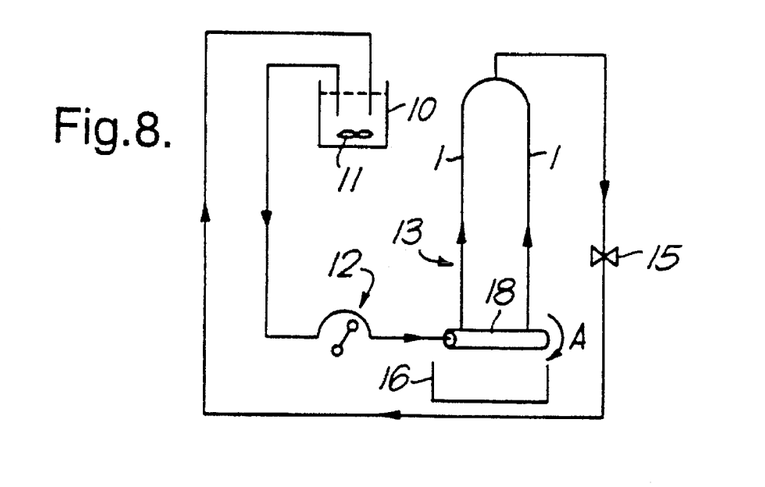
Figure 9:
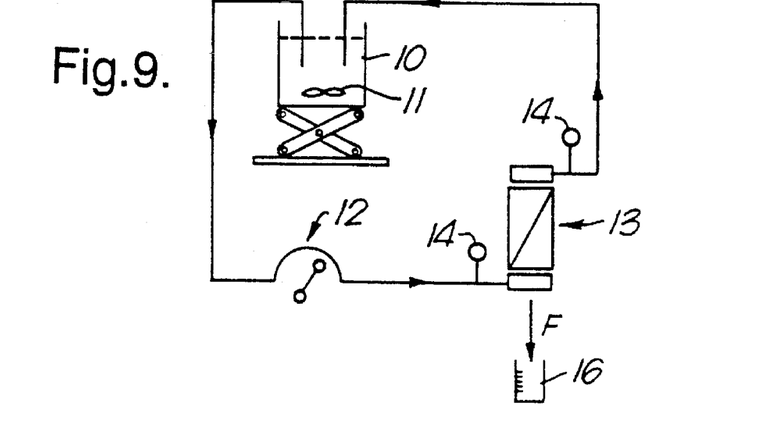
FIG. 9 is a view of a test circuit to demonstrate microfiltration of blood using the embodiment of FIGS. 3 and 4.

The performance of the two filters described above have been evaluated in a series of tests, the results of some of which are now presented. The test circuits used for these tests are illustrated in FIGS. 7, 8 and 9. The common components of these circuits are a closed circuit comprising a reservoir 10 containing the test fluid to be filtered and incorporating a stirrer 11, a peristaltic roller pump 12 and the filter 13 under test. Pressure at various points around the circuit is tested by a pressure gauge 14, for example a Budenberg gauge. The filter 13 may be pressurised by a needle valve 15 connected in series with its output. Filtrate F falls by gravity into a vessel, shown diagrammatically under reference 16.

The tests are designed to be operated with quasi-steady laminar helical flows and were carried out on ultrafilters and microfilters:

Ultrafilters

An ultrafiltration rig (FIGS. 7 and 8) was built with a filter 13 comprising two PCI tubular membranes 1 (PCI Membrane Systems Limited, polysulphone PU 120 with molecular weight cutoff of 20 kD), arranged in parallel and connected at the top to form a U-shaped path, and with each tube containing a concentric insert (not shown). Each tubular membrane was of internal diameter 12.5 mm and effective length 950 mm. The total membrane area was 746 cm$^2$.

Two different designs of concentric insert were evaluated. The first consisted of helical inserts of the type illustrated in FIG. 1 of maximum diameter 11.9 mm and with a helix of semicircular cross-section and pitch 5.5 mm. The second were uniform rods (i.e. with no helical groove) of 9.9 mm diameter.

Ultrafiltration performance was measured from bovine serum albumin (BSA) solutions of high concentration (60 g/l) under a wide range of operating conditions.

The roller pump 12 was used to provide quasi-steady flow from the reservoir 10, through the U-shaped ultrafilter 13, back to the reservoir. The ultrafilter was pressurised by varying the needle valve 15 in the outflow line. Pressure at the downstream end of the ultrafilter was measured with a Budenberg gauge 14.

Oscillatory flow was generated by a pair of circular pistons 17 (FIG. 7) acting on pump bags at the open ends of the U-shaped tubular channel.

In the configuration shown in FIG. 8, a rotary valve 18 was used to switch the flow from one membrane tube to the other alternately. The valve rotated at 74 rpm, as represented by arrow A, providing a pulse frequency of flow to each tube of 148 rpm, or 2.47 Hz.

Fresh bovine serum albumin was mixed with distilled water to a concentration of 60 g/l and the value of the pH of the solution was recorded. The pH had a mean value of 6.99 and a range of (6.92, 7.15).

Clean water flux was measured at the beginning and end of each experiment, for which fresh membrane tubes were used. Distilled water was pumped through the ultrafilter at a chosen rate and at a controlled pressure. All the measurements reported here were undertaken at a trans-membrane pressure of 2 bar, measured at the downstream end of the ultrafilter. Ultrafiltrate was collected in a measuring cylinder 16 over a 1-minute interval. Two such measurements were made for each setting of the parameters.

For measurements of ultrafiltration rate from BSA solutions, the reservoir was filled with 0.75 l of BSA solution at 60 g/l concentration, which was then pumped through the circuit until 300 ml of prime water was displaced. The prime volume of the circuit, excluding the reservoir but including the filter and tubing, was measured to be 400 ml. Thus the true concentration of the BSA solution was 52.9 g/l.

Filtration rate was measured as a function of operating parameters.

Microfilters

Two designs of microfilter were built and evaluated in the separation of fresh bovine blood. The first design was of the type illustrated in FIGS. 1 and 2, and consisted of a tubular microfiltration membrane 1 (Gelman Versapor 0.45 μm pore diameter), supported by a rigid Perspex shell with longitudinal plasma collection channels machined in it. The membrane unit has an internal diameter of 12.5 mm and a length of 20 cm to provide an active membrane area of 79 cm$^2$. Two shapes of concentric helical insert 2 were evaluated. Both were loosely-fitting and were of diameter 11.9 mm, and had helices of semi-circular cross-section leaving a gap G of 0.3 mm width. One insert had a helix of 3.5 mm pitch, the other had a helix of 5.5 mm pitch; the width of the groove 3 in the longitudinal direction was 3.0 mm and 5.0 mm respectively.

The second design was of the type illustrated in FIGS. 3 and 4 and consisted of a tubular microfiltration membrane 6 (Gelman Supor 0.2 μm pore diameter or Gelman Versapor 0.45 μm pore diameter) supported on a grooved, cylindrical core (not shown). A helical flowpath external to the tubular membrane was provided by the moulded epoxy shell 4. This external helix was of semi-circular cross-section and had a pitch of 3.5 mm; the width of groove 5 was 3.00 mm.

The microfilters were tested in the circuit shown in FIG. 9. A four-roller peristaltic pump 12 provided quasi-steady flow at rates of 100 ml/min to 400 ml/min. An elevated reservoir 10 of bovine blood ensured that the transmembrane pressure at the outlet of the microfilter lay in the range 60–90 mmHg. The blood haematocrit in the reservoir was maintained at 38%. Plasma flow rate was measured with a cylinder and stopwatch.

Ultrafiltration

Filtration results, from high-concentration BSA (60 g/l), obtained with the ultrafilter with rod inserts of 9.9 mm diameter are shown in Table 1. The type of flow applied (oscillatory, chopped or steady) is shown in the first column, the mean inlet flow rate is shown in the second column and the filtration rate in the third. Corresponding results with the same filter perfused with clean, distilled water at the beginning and end of the experiment are shown in the last two rows of the table.

TABLE 1

| Operating Conditions | $Q_{in}$ml/min | $Q_F$ml/min | $R_T$bar cm/s | Rbar cm/s | $R_m/R_T$ |
| --- | --- | --- | --- | --- | --- |
| BSA 60g/ | | | | | |
| Oscillatory, low flow | 144 | 15.4 | 5806 | 3921 | 0.32 |
| Oscillatory, high flow | 405 | 16.8 | 5322 | 3437 | 0.35 |
| Chopped, low flow | 145 | 7.0 | 12789 | 10904 | 0.15 |
| Chopped, high flow | 338 | 10.2 | 8755 | 6870 | 0.22 |
| Steady, low flow | 159 | 9.6 | 9339 | 7454 | 0.20 |
| Steady, high flow | 399 | 13.5 | 6654 | 4769 | 0.28 |
| Clean Water | | | | | |
| Beginning | 383.5 | 47.5 | 1885 | — | 1.0 |
| End | 365.5 | 45.5 | 1967 | — | 0.96 |

The results are presented in terms of total resistance, $R_T$ (bar cm/s) in the fourth column. The fifth column gives the resistance R, after the membrane resistance $R_m$, is deducted. The efficiency, $R_m/R_T$, is shown in the sixth column.

The resistances were calculated as follows:

The filtration flux, $J_T$ was calculated from $$J_T = \frac{Q_F(\text{ml/min})}{60 \times 746} \text{ ml/cm}^2/s$$

Since the effective membrane area was 746 cm².

The total resistance $R_T$ is given by $$R_T = R_m + R = \frac{\Delta p}{J_T} \text{ bar cm/s}$$

where $R_m$ is the membrane resistance (measured by clean water flux), R is the fluid-side resistance and $\Delta p$ is the trans-membrane pressure in bar.

The ratio of the filtration fluxes (BSA and clean water) is $$\frac{J_T}{J_m} = \frac{R_m}{R_T} = \frac{Q_F}{(Q_F)_{water}} = \text{Efficiency}$$

The corresponding results for the tubular rig with the helical inserts of FIG. 1/2 are shown in Table 2.

TABLE 2

| Operating Conditions | $Q_{in}$ml/min | $Q_F$ml/min | $R_T$bar cm/s | Rbar cm/s | $R_m/R_T$ |
| --- | --- | --- | --- | --- | --- |
| BSA 60g/ | | | | | |
| Oscillatory, low flow | 131.5 | 44.4 | 2016 | 511 | 0.75 |
| Oscillatory, high flow | 378.5 | 44.5 | 2012 | 507 | 0.75 |
| Chopped, low flow | 153 | 28.3 | 3169 | 1664 | 0.47 |
| Chopped, high flow | 388.5 | 36.5 | 2453 | 948 | 0.61 |
| Steady, low flow | 148 | 32.1 | 2786 | 1281 | 0.54 |
| Steady, high flow | 375 | 44.3 | 2020 | 515 | 0.75 |
| Clean Water | | | | | |
| Beginning | 367.5 | 59.5 | 1505 | — | 1.0 |
| End | 391 | 55.0 | 1628 | — | 0.92 |

It can be seen that the results for the helical filter are much better than for the filter with the 9.9 mm diameter bare rods. Results with 7.9 mm diameter bare-rod inserts were even worse, and are not presented here. Perhaps the most striking result is that steady flow through the helical filter provided 54% (low flow) and 75% (high flow) of the flux rate achieved with clean water at the same transmembrane pressure.

Neither chopped nor oscillatory flow produced any further enhancement in efficiency at the higher flow rate through the helical filter.

Microfiltration

Figure 10:
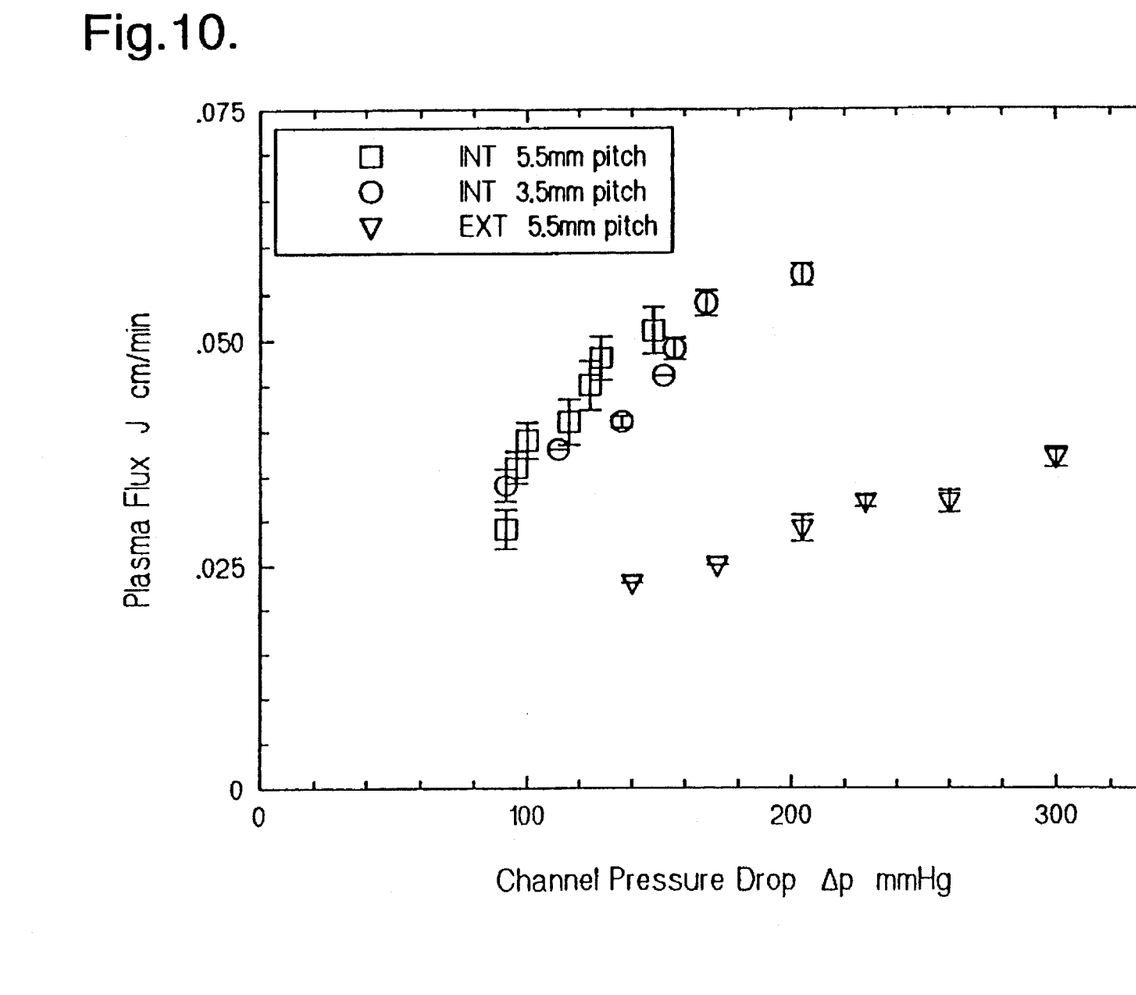
FIGS. 10 and 11 are graphs plotting plasma flux against channel pressure for different geometries of filter.
Figure 11:
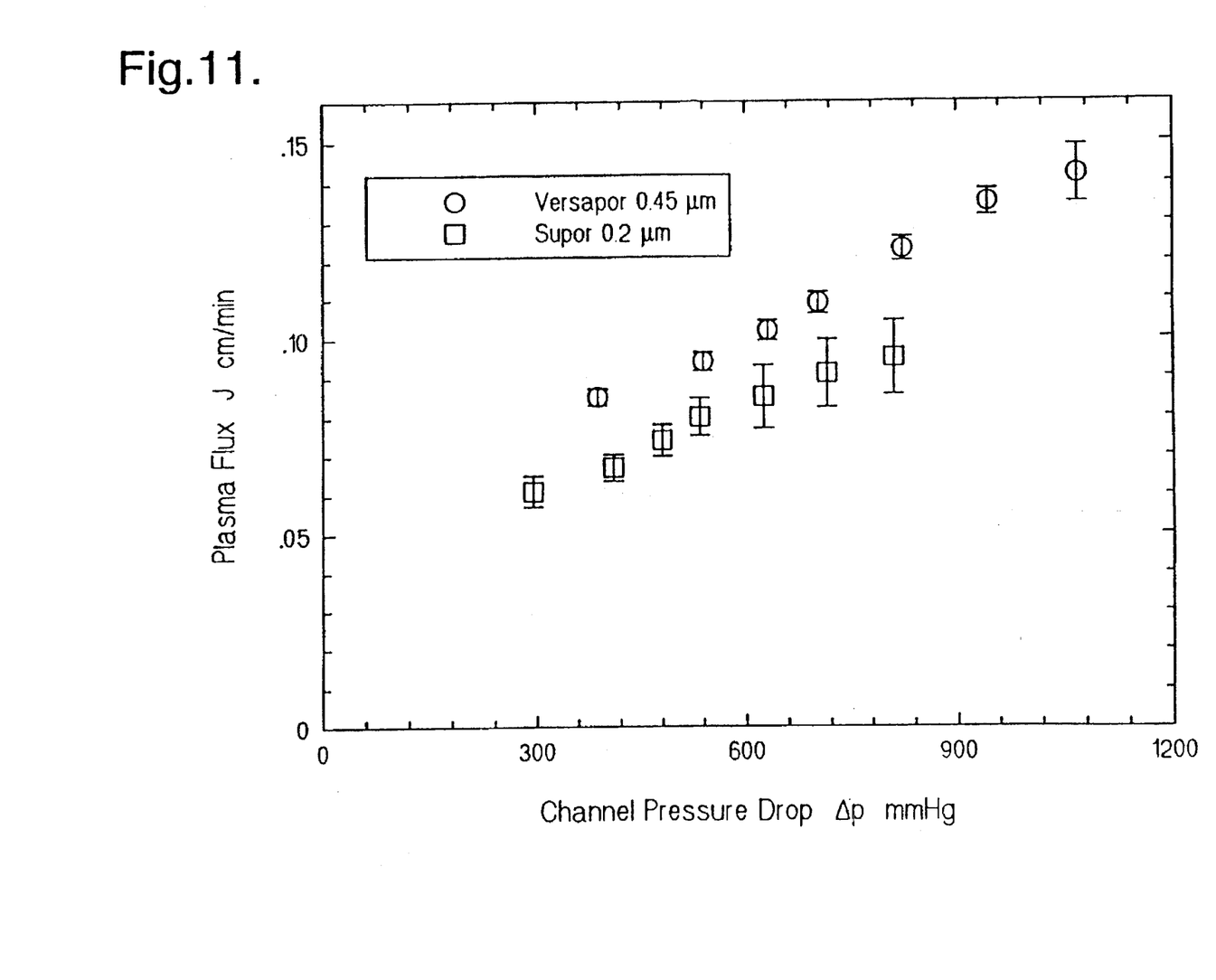

Plasma flux (i.e. plasma filtration rate divided by membrane area) is shown plotted against channel pressure drop, as measured by pressure gauges 14 at input and output, in both of FIGS. 10 and 11. FIG. 10 presents three sets of results, namely 3.5 mm pitch and 5.5 mm pitch internal helical members of the type illustrated in FIGS. 1 and 2 and 5.5 mm pitch external helical members of the type illustrated in FIGS. 3 and 4. The modest results achieved with the internal helical member, in particular, prompted further investigation of filters using external helical members of the type described with reference to FIGS. 3 and 4.

Figure 12:
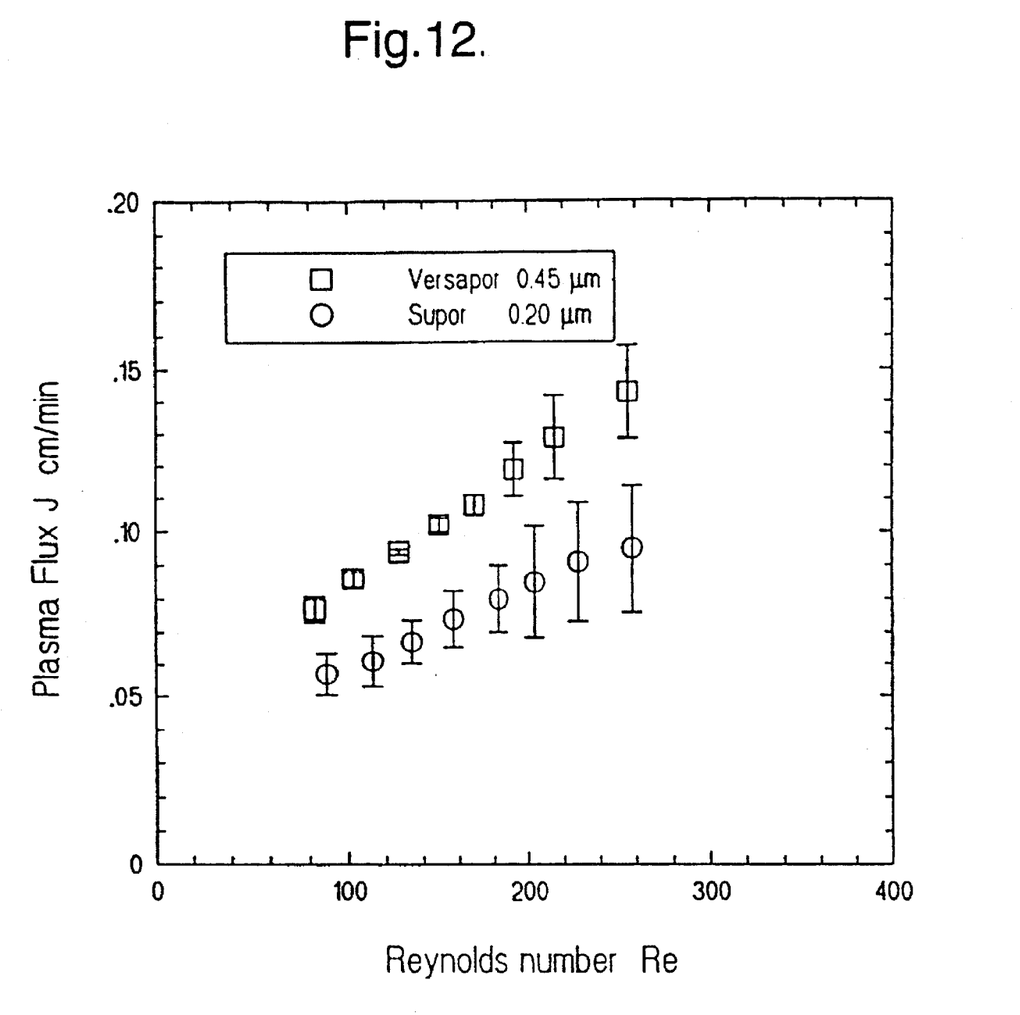
FIG. 12 is a graph plotting plasma flux against Reynolds number using the test circuit of FIG. 9.

The external helix microfilter with 5.5 mm pitch was evaluated with bovine blood using two different polysulphone membranes. Filtration performance for two different tests are shown in FIGS. 11 and 12. The Reynolds number is given by $$Re = \frac{U_{peak}h}{v}$$

where $U_{peak}$ is the velocity calculated by dividing the outlet blood flow rate, $Q_{out}$ by the cross-sectional area of the helix. The channel gap is defined as the radius of the helix cross-section, and is given by $2h = 1.5$ mm for the helix of 3.5 mm pitch and $2h=2.5$ mm for the helix of 5.5 mm pitch.

The external helix microfilter produced a flux of around 0.1 cm/min when the Supor membrane was used, double the performance achieved with the internal helix microfilter. When the Versapor membrane was used (which differed from the Supor by having a stiff fibrous support structure as well as slightly larger pores), the results were even better, giving a flux of around 0.125 cm/min. This matched the best of the results we have obtained with vortex-mixing and standing-vortex-wave microfilters, and was achieved at a matching peak Reynolds number.

There was no evidence of red cell damage in any of the blood filtration experiments.

Power dissipation

The power dissipation within the external helix can be calculated from the product of the pressure drop over the 20 cm length, $\Delta p$, and the blood flow rate $Q_{out}$:

$$P = \Delta p Q_{out}$$

Figure 13:
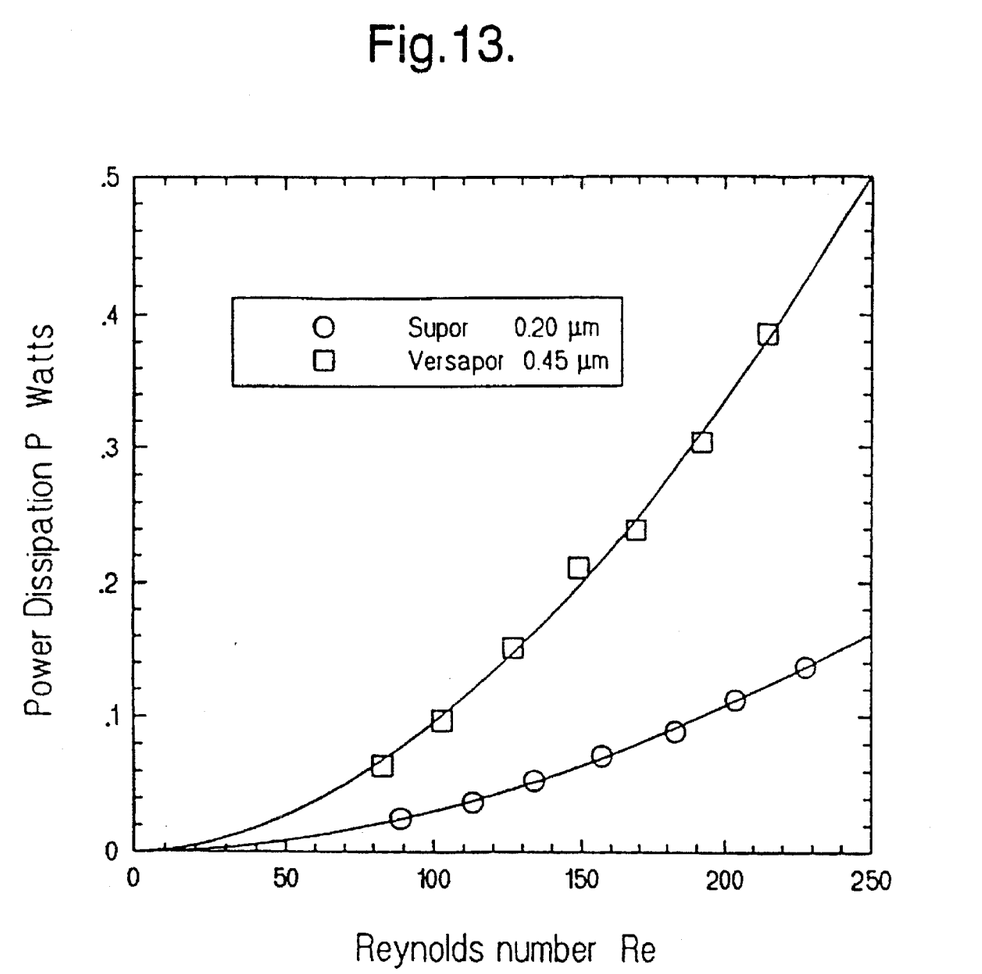
FIG. 13 is a graph plotting power dissipation against Reynolds number using the test circuit of FIG. 9.

The results presented in FIG. 13 show that the superior filtration performance of the Versapor membrane is counterbalanced by the greater power dissipation. For both Supor and Versapor a curve-fit shows that the power dissipation is approximately proportional to the square of the Reynolds number. This can be interpreted as a linear relationship between pressure drop and Reynolds number which in turn suggests laminar flow conditions.

Effect of Pump Frequency and Pulsations we assessed the influence of the peristaltic pump by replacing the standard 4 mm bore tubing with a larger tube of 8 mm bore. This allowed us to maintain our range of flow rates at lower rotational pump frequencies. The performance is compared at two Reynolds numbers in Table 1.

The results show that higher rotational speeds enhance filtration flow rates. This suggests that flow pulsations aid the mixing process and enhance filtration efficiency.

TABLE 3

| Reynolds Number | Pump Frequency rpm | Tubing Diameter mm | Plasma Flux cm/min |
|---|---|---|---|
| 162 | 20 | 8 | 0.081 |
| 162 | 80 | 4 | 0.108 |
| 238 | 30 | 8 | 0.089 |
| 238 | 110 | 4 | 0.142 |

It is felt that careful design of the flow waveform applied to the filter could augment the effects already achieved by the design described above. A sharp deceleration in flow rate enhances the vortex effect and therefore a sawtooth-like waveform, with a slow acceleration, followed by a sharp deceleration could be beneficial. The relationship between the pulse rate and the pitch of the helical groove 3, 5 may also be significant. In particular, the following inequality should apply:

$$\frac{\text{frequency of pulsation} \times \text{pitch}}{\text{Core velocity}} < 10$$

where frequency is in Hz
pitch is in m
velocity is in m/sec

Discussion of Results

The tubular ultrafilter with helical inserts worked very well when perfused with quasi-steady flow at modest flow rates (400 ml/min). Even at high concentrations of bovine serum albumin (60 g/l), filtration flux reached a level of 75% of the maximum possible for the tubular membranes.

The tubular microfilter with similar helical inserts also worked reasonably well, providing plasma flux of between 0.045 and 0.055 cm/min, although plasma flux in the range 0.1 to 0.15 cm/min is routinely obtained with standing-vortex-wave microfilter designs. However, these require oscillatory flow.

The tubular microfilter with an external helix of 5.5 mm pitch produced plasma flux of up to 0.15 cm/min, matching the best of the previous designs, but using quasi-steady flow. The improved performance of the external helix design, compared with the filter with an internal helical insert appears to be due mainly to the centrifugal forces acting to move the blood cells away from the membrane in the external helix design, and acting to move the cells towards the membrane in the internal helix design.

The helical designs will be easy to manufacture and are likely to find application in membrane separation processes where flow rates are sufficient to generate the necessary secondary flows. In these applications, which will include ultrafiltration, microfiltration and gas exchange, the feed flow can be steady.

I claim:

1. A filter comprising a tubular, substantially cylindrical, porous membrane mounted coaxially with and radially spaced from a generally cylindrical profiled surface, which surface is formed with at least one helical groove such that a fluid to be filtered is passed into the filter from one end thereof between the membrane and the profiled surface in a helical flow, and means for inducing or enhancing, in the helical flow of the fluid to be filtered, a corkscrew vortex flow, said means comprising the shape of said groove, when seen in longitudinal cross section, being concave and formed of a substantially continuously curved surface.

2. A filter as claimed in claim 1 wherein said means are such as to produce a single corkscrew vortex within the helical flow, said vortex substantially filling the whole space occupied by said helical flow, when seen in longitudinal section.

3. A filter as claimed in claims 1 or 2 wherein the profiled surface has a diameter such as to define a gap between itself and the membrane, in which gap a leakage flow of fluid occurs between adjacent turns of the helical groove, said leakage flow being operable to induce or enhance said corkscrew vortex flow within the helical flow.

4. A filter as claimed in claim 3 wherein the width G of said gap is at least 10 times smaller than the facing diameter of the tubular membrane.

5. A filter as claimed in claim 4 wherein said gap G is between 10 and 60 times smaller than the facing diameter of the tubular membrane.

6. A filter as claimed in claim 5 wherein said gap G is between 30 and 50 times smaller than the facing diameter of the tubular membrane.

7. A filter as claimed in claim 1 or 2 wherein the shape of the groove in cross section is part-circular.

8. A filter as claimed in claim 1 or 2 wherein the shape of the groove in cross section is semi-circular.

9. A filter as claimed in claim 1 or 2 wherein the width of the helical groove in the longitudinal direction is not greater than three times the depth of the groove.

10. A filter as claimed in claim 9 wherein the width of the groove in the longitudinal direction is not greater than twice the depth of the groove.

11. A method of filtering a fluid comprising: constraining the fluid being filtered to flow along a helical path bounded at least in part by a porous filter membrane and an opposing profiled surface; inducing or enhancing a corkscrew vortex flow in the helical flow; and selectively configuring the shape of the profiled surface and the location of the profiled surface relative to the filter membrane such that the helical flow is subject to a single corkscrew vortex flow which is dominant in terms of size and strength and acts on substantially the whole helical flow.

12. A method as claimed in claim 11 wherein a leakage flow of fluid being filtered is created between adjacent turns of said helical path, said leakage flow acting to induce or enhance said corkscrew vortex flow.

13. A filter comprising a tubular, substantially cylindrical, porous membrane mounted coaxially with and radially spaced from a generally cylindrical profiled surface, said profiled surface having a diameter such as to define a gap between itself and the membrane, and which surface is formed with at least one helical groove, the shape of said groove, when seen in longitudinal cross section, being concave and formed of a substantially continuously curved surface, such that a fluid to be filtered is passed into the filter from one end thereof between the membrane and the profiled surface and flows in a helical path, said gap being such as to cause a leakage flow of fluid between adjacent turns of the helical groove, said leakage flow being operable to induce or enhance, within the helical flow of the fluid to be filtered, a corkscrew vortex flow.

14. A filter as claimed in claims 1,2 or 13 wherein, for a single-start helical groove, the ratio P/d, where p is the pitch of the helical groove, and d is the facing diameter of the membrane, is in the range 1/8 to 1/1.

15. A filter as claimed in claim 14 wherein the ratio P/d is in the range 1/4 to 1/2.

16. A filter as claimed in claims 1, 2 or 13 wherein the profiled surface is formed as the outer peripheral surface of a cylindrical core mounted coaxially within the tubular membrane.

17. A filter as claimed in claims 1, 2 or 13 wherein the profiled surface is formed as the inner peripheral surface of a cylindrical shell within which the membrane is mounted coaxially.

* * * * *